Sept. 25, 1956     A. SCHRIEDER     2,764,044
TURRET HEAD FOR MOUNTING ON THE VERTICALLY RECIPROCABLE
SLEEVE OF A DRILLING OR MILLING MACHINE
Filed March 13, 1952
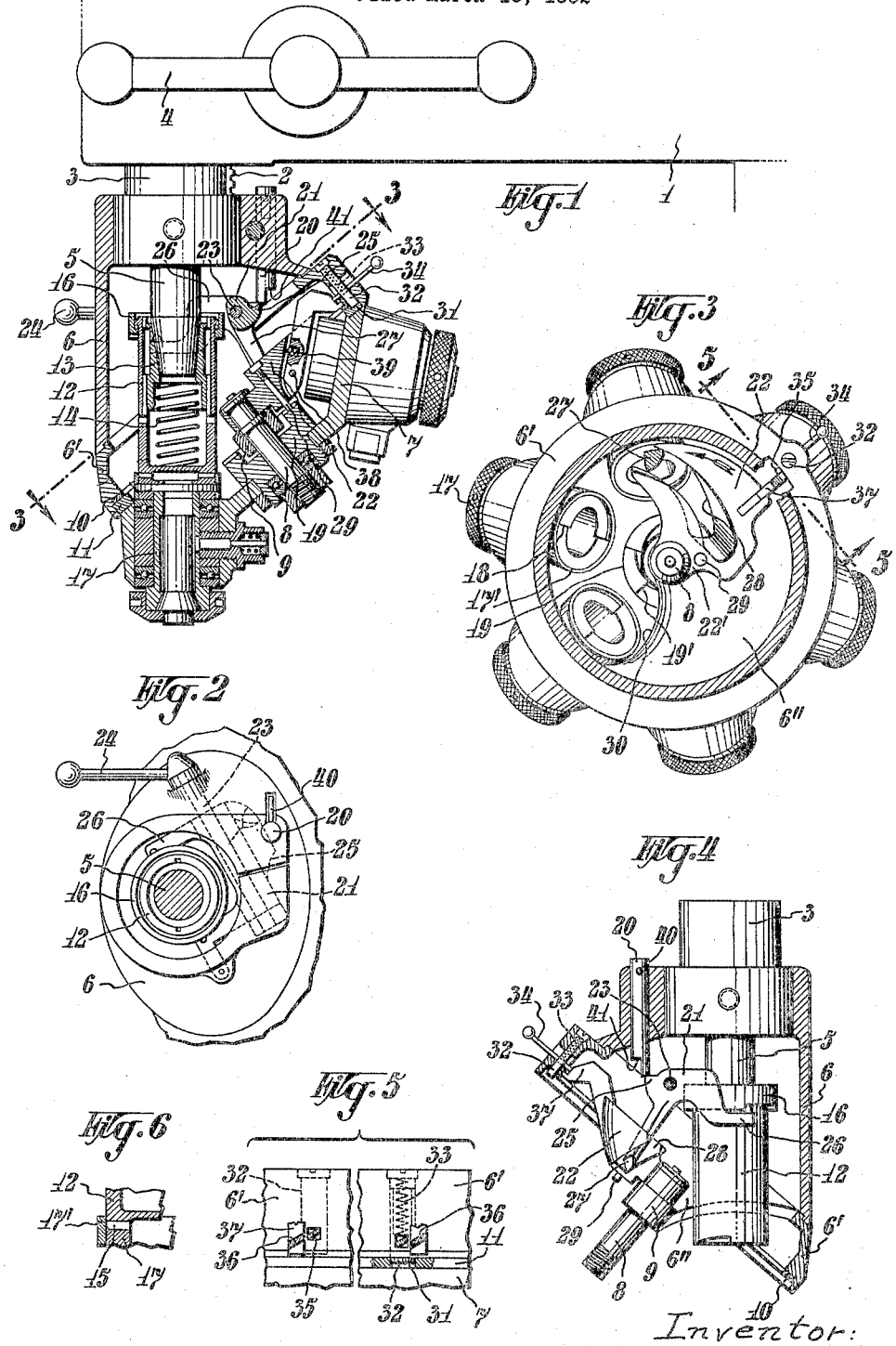
Inventor:
Albert Schrieder
By Young, Emery & Thompson
Attys.

United States Patent Office 2,764,044
Patented Sept. 25, 1956

2,764,044

TURRET HEAD FOR MOUNTING ON THE VERTICALLY RECIPROCABLE SLEEVE OF A DRILLING OR MILLING MACHINE

Albert Schrieder, Stuttgart-Feuerbach, Germany

Application March 13, 1952, Serial No. 276,352

Claims priority, application Germany March 19, 1951

4 Claims. (Cl. 77—25)

This invention relates to a turret head which can be mounted on the vertically reciprocable sleeve of a drilling or milling machine, said head having an underpart carrying the work spindles and adapted for advance rotation about an axis inclined to that of the work spindle, said head carrying a drive pin operated by contact with the machine frame on upward movement of the spindle sleeve to effect the various operations of the turret head. The object of the present invention is to provide a turret head of this type which will satisfy these requirements.

According to the present invention the vertical shifting of the drive pin is converted by means of a spider rotatably mounted in an upper part of the turret head and a segment plate provided with a cam slot and rotatable about the pivot axis of a lower part of the head, a finger of the spider engaging a cam slot in the segment plate which finger is connected to the head lower part by coupling means operative only in the direction of rotational advance of the turret head.

By means of this mechanism the improvement is achieved that a smaller travel of the drive pin, amounting to only a few millimeters, is sufficient to reduce the required rotary advance of the underpart of the turret head. During this movement the upper part and the lower part of the turret head remain constantly in contact without any separation of these parts taking place. The mechanism of the present invention makes it possible to provide the lower head part with two or more and usually with six work spindles. In every case the mechanism of the invention makes possible a greater or lesser rotary advance of the turret underpart from 180° down to less than 60°.

According to another feature of the invention a coupling sleeve is positively connected to the machine drive spindle and is slidable axially against spring action, said sleeve cooperating with the active work spindle and being raised by an arm of the spider. The spring acting on the coupling sleeve effects return movement of the control parts after the lower head part of the turret has been advanced a step.

The rim of the head lower part has a number of angularly spaced notches corresponding to the number of work spindles, which notches can engage a latch pin spring mounted in the opposing rim of the underpart of the turret when the work spindle arrives in active position. This latch pin is controlled by the turning of the segment plate. The parts cooperating with this latch pin are so formed that they prevent complete return movement of the separting mechanism if, owing to faulty operation, the latch pin should not enter the corresponding notch in the head underpart. Consequently, the coupling between the drive spindle and the work spindle can take place only when these parts are in the correct working position with respect to each other.

Further features of the invention will be understood from the claims appended hereto. It is pointed out, however, that the turret head according to the present invention operates in such a manner that upon rotation of the above mentioned spider and the consequent turning of the segment plate, the disengagement of the coupling sleeve and the unlatching of the latch pin will follow. Only then is advance rotation of the underpart possible, and the new active position is fixed by the engagement of the latch pin in the next notch of the underpart, whereupon the return movement of the advancing and coupling devices takes place.

The drawing illustrates by way of example an embodiment of the turret head in which:

Figure 1 is a vertical cross section of the turret head on a drilling machine,

Figure 2 is a partial plane view of the head corresponding to Figure 1,

Figure 3 is a cross section taken on line 3—3 of Figure 1,

Figure 4 is a view similar to Figure 1 with the head turned through 180°, the head underpart being omitted, Figure 5 is a section taken on line 5—5 of Figure 3, showing the control members in two different operative positions, and Figure 6 is a section on an enlarged scale showing the engagement of the coupling sleeve with the work spindle, the showing being limited to the left side of Figure 1.

In Figure 1 only the horizontal arm of the frame of a drilling or milling machine is illustrated, in which in an arm 1 a spindle sleeve 3 can move up and down, for which purpose it carries a rack 2. This axial movement of the spindle sleeve 3 is effected by means of a hand lever 4 on the axis of which is attached a gear pinion, not shown, engaging the rack 2. A drive spindle 5 is located inside the spindle sleeve 3 and a turret head consists of an upper part 6 and a lower part 7, the latter being supported on a pivot shaft 8. The upper part 6 is fixed in any suitable manner to the spindle sleeve 3 and for convenience of production and assembly, the upper head part consists of two interconnecting members 6 and 6′, the latter being an annular housing comprising a bearing 9 for the pivot shaft 8 which is inclined at an angle of 40–45° to the drive spindle 5. The rim of the lower part engages the rim of the upper part member 6′ and the parts 6′ and 7 are preferably made of light metal and in this case steel rings 10 and 11 are inserted into the cooperating rims of these members.

The drive spindle 5 is positively connected to a coupling sleeve 12. In the embodiment illustrated, the drive spindle 5 has a conical end engaging a corresponding conical bore of a bush 13 connected in any suitable manner with the outer coupling sleeve 12 in such a manner as to enable the coupling sleeve 12 to slide axially relatively to the bush 13. A helical compression spring 14 located inside the coupling sleeve 12 engages the latter to urge it downwardly, the lower end of which coupling sleeve is provided with teeth 15. At its upper end the coupling sleeve 12 is formed with a collar 16.

In the illustrated embodiment of the head the lower part 7 carries six work spindles 17 adapted to receive different tools. Each work spindle 17 may be equipped with a suitable chuck or the like for holding the tool and each work spindle is provided at its upper end with coupling teeth 18 corresponding to the coupling teeth 15 of the sleeve 12. For secure guiding and centering, the different work spindles 17 are provided at their upper ends with a rim 17′ in which the coupling sleeve 12 engages, as shown in detail in Figure 6 which also shows that the engaging parts may be of conical formation. The lower rim of the rotary underpart 7 has fixed thereto a claw coupling member 19 traversed centrally by the pivot shaft 8 and having teeth 19′ provided with bevelled surfaces.

The cooperating control members consist of a drive pin 20, a spider 21 and a segment plate 22.

The drive pin 20 is slidably mounted in a vertical bore in the upper part 6 with its upper end projecting above said part and cooperating in known manner with the fixed arm 1 of the machine frame. The spider 21 is non-rotatably mounted on a stub shaft 23 in the upper part 6, which shaft 23 carries a handle 24 to enable the spider 21 to be also manually operated. The drive pin 20 cooperates with a nose or arm 25 of the spider 21 and the latter has a long arm 26, preferably forked, which engages under the collar 16 of the coupling sleeve 12. The spider 21 has a further arm or finger 27 which extends downwardly and engages a specially shaped cam slot 28 in the segment plate 22. The segment plate has a hub portion 22' which can turn on the pivot shaft 8 above the bearing 9. The special shape of the cam slot 28 is best seen in Figures 3 and 4 and its distance from the axis of the pivot shaft 8 diminishes in inward direction. Further, it is so formed that it provides a substantially frictionless contact with the finger 27. The movement of the finger inside the cam slot 28 produces rotation of the segment plate 22 which latter carries a spring pressed coupling pin 29 extending parallel to the pivot shaft 8. Its spring urges the coupling pin 29 downwardly into the teeth 19' of the claw coupling member 19.

The bearing 9 is connected by a funnel-shaped wall 6" to the upper part member 6'. This wall 6" has a large opening 30 shown in Figure 3 in which opening the segment plate 22 projects and also the coupling sleeve 12 extends downwardly through the opening. The wall 6" also forms a stop for the segment plate 22 in its position of rest shown in Figure 3.

The above described turret head operates as shown. However, in order to determine with greater reliability the individual positions of operation and to prevent coupling of the active work spindle in the event of a faulty advance the turret head is provided with further devices which will now be described.

In the rim of the underpart 7 or in the inserted steel ring 11 there are provided notches or holes 31 spaced according to the pitch of the work spindle. Thus, in the illustrated embodiment six stub notches 31 are distributed around the circumference. In the upper part member 6' there is a latch pin 32 extending parallel to the pivot shaft 8, said pin being slidable in the part 6' and a spring 33 constantly urges the latch pin 32 in downward direction. The latch pin 32 has a small hand grip 34 extending outwardly so that it can be manually operated. The latch pin 32 has an inwardly extending oblique nose 35, see Figure 5, from which it will be seen that it has an oblique surface at the top and bottom. This oblique nose 35 cooperates with a similarly shaped bevelled plate 36 on a lever 27, jointedly connected by a pin 38 to the segment plate 22. The lever 37 is acted upon inside the segment plate by a small pressure spring 39 so that to a certain extent it is resiliently supported. The cooperation of these control members 35, 36 will be understood from the following description of operation:

Assuming that a drilling or milling operation has been completed, the work spindle 5 is moved upwardly by means of the hand lever 4. In this operation the drive pin 20 contacts the frame arm 1, whereby upon further upward movement the drive pin 20 is pressed downwardly into the upper head part 6. In this movement the drive pin 20 presses on the nose 25 of the spider 21 causing it to rotate about its axis 23. This rotation first produces, through the forked arm 26, a lifting of the coupling sleeve 12 with compression of the spring 14. The coupling teeth 15, 18 disengage and at the same time the turning finger 27 of the spider 21 effects rotation of the segment plate 22 in the direction indicated by the arrow in Figure 3. The lever 37 follows the rotation of the segment plate 21 and its bevel plate 36 engages under the nose 35 of the latch pin 32 as shown at the right portion of Figure 5. By means of the plate 36 the latch pin 32 is raised above the nose 35, so that it disengages the notch 31 in the lower part 7. Upon further rotation of the lever 37 the spring 33 again urges the latch pin 32 downwardly until said pin reaches the rim of the underpart 7 of the steel ring 11, since meanwhile by rotation of the segment plate 22, the coupling pin 29 has been brought into contact with a tooth 19' of the coupling member 19, and the advance of the underpart 7 has begun. The underpart 7 is further driven by the coupling pin 29 until the latch pin 32 snaps into the next notch 31 of the underpart. In this position the raised coupling sleeve 12 is in axial alignment with the next work spindle 19. When the spindle sleeve 3 is moved downwards the tension spring 14 effects the movement of all the control and coupling members, that is the coupling sleeve 12 engages the new work spindle 17. The segment plate 22 turns backwards causing the coupling bolt 29 to ride over the coupling teeth 19' to the next tooth gap. Also, the lever 37 moves backwards riding resiliently over the bevel nose 35, and comes finally into the position of rest shown in Figure 3. The turret head is then ready for a further operation.

In the event that during the advance rotation of the lower part 7 the latch pin 32 should not properly engage the next notch 31, the nose 35 will assume the position shown at the left of Figure 5. In this position the bevel nose 35 forms a stop for the back swinging lever 37 which is engaged by the plate 36 in such a manner that complete return movement of the control and coupling members cannot be effected. Complete return movement of these parts can only take place either after the advance by the lever 24 or by complete turning of the lower member 7 has been effected in such a manner that the latch pin 32 can enter a notch 31.

Each further advance is effected automatically when the drive spindle 5 is rotating by upward and downward movement of the spindle sleeve 3. It should be noted that the drive pin 20 can be turned through 180° for which purpose it is provided with a small hand grip 40 shown in Figure 2. The drive pin is provided at its lower end with a notch 41, and when it is turned through 180° it makes no contact with the nose 25 of the spider 21. Further advance of the turret head will not occur with the drive pin 20 in this position. The upper and lower parts of the turret head constitute an enclosed housing protecting the control and coupling parts from dirt.

The turret head can also be used in other kinds of machine tools, particularly in woodworking machines.

I claim:

1. A turret head attachable to a vertically movable spindle sleeve of a drilling or milling machine, comprising an upper part, a lower part connected to the upper part and having a plurality of work spindles mounted therein for rotation stepwise about an axis inclined to the machine drive spindle to advance the latter successively into active position, a drive pin for effecting the rotation of the lower part and work spindles mounted in said head and actuated on upward movement of the work spindle by contact with the machine, a spider rotatably mounted in the upper part of the head and having a plurality of fingers, a segment plate provided with a cam slot rotatable about a pivot axis of the lower part of the head, a finger of the spider engaging the cam slot of the segment plate, and coupling means between the head and segment whereby said last-mentioned finger is connected to the lower part of the head by the coupling means operative only in the direction of rotational advance of the head.

2. A turret head according to claim 1 in which a coupling sleeve is provided positively connected to the machine drive spindle and slidable axially against spring action, said sleeve cooperating with the active work spindle and being connected to and actuated by a finger of the spider.

3. A turret head according to claim 1, in which a coupling sleeve is provided positively connected to the machine drive spindle and slidable axially against spring action, said sleeve cooperating with the active work spindle and being connected to and actuated by a finger of the spider, the spring acting on the coupling sleeve effecting return movement of the spider and segment plate after the lower part of the head has been advanced one step.

4. A turret head according to claim 1, in which the rim of the lower head part has a number of angularly spaced notches corresponding to the number of work spindles engageable with a latch pin and spring mounted on the opposing rim of the upper part when the work spindle is in active position, said latch pin being controlled by the turning of the segment plate.

References Cited in the file of this patent

UNITED STATES PATENTS

| | | |
|---|---|---|
| 1,248,750 | Tambs | Dec. 4, 1917 |
| 1,924,383 | Stampfli | Aug. 29, 1933 |
| 2,491,859 | Hijmans | Dec. 20, 1949 |